United States Patent
Yoshino et al.

(10) Patent No.: US 6,691,150 B1
(45) Date of Patent: *Feb. 10, 2004

(54) INFORMATION DEVICE, INFORMATION DEVICE SYSTEM CONTROL METHOD, AND INFORMATION DEVICE SYSTEM

(75) Inventors: Yoshikatsu Yoshino, Yokohama (JP); Tsukasa Hasegawa, Hiratsuka (JP); Chiyo Akamatsu, Yokohama (JP); Shinichiro Fukushima, Yokohama (JP); Hidefumi Goto, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/557,221

(22) Filed: Apr. 25, 2000

Related U.S. Application Data

(63) Continuation of application No. 08/996,142, filed on Dec. 22, 1997.

(51) Int. Cl.[7] ................................................ G06F 15/16
(52) U.S. Cl. ....................... 709/201; 709/204; 709/205; 709/227; 709/228; 709/253
(58) Field of Search ................................. 709/204, 201, 709/205, 227, 228, 253, 219, 220; 340/825.22; 370/384; 463/36

(56) References Cited

U.S. PATENT DOCUMENTS

| | | | |
|---|---|---|---|
| 4,100,601 A | | 7/1978 | Kaufman et al. ............. 710/32 |
| 4,995,071 A | | 2/1991 | Weber et al. |
| 5,263,869 A | | 11/1993 | Ziv-El ......................... 709/204 |
| 5,455,570 A | * | 10/1995 | Cook et al. ............ 340/825.22 |
| 5,671,445 A | | 9/1997 | Gluyas et al. ................ 710/53 |
| 5,807,175 A | * | 9/1998 | Davis et al. .................. 463/36 |
| 5,864,673 A | * | 1/1999 | Ohto et al. .................. 709/219 |
| 5,887,193 A | | 3/1999 | Takahashi et al. |
| 5,896,500 A | | 4/1999 | Ludwig et al. ............. 709/204 |
| 5,907,549 A | * | 5/1999 | Nagao ........................ 370/384 |
| 6,131,111 A | * | 10/2000 | Yoshino et al. ............. 709/204 |
| 6,487,589 B1 | * | 11/2002 | Yoshino et al. ............. 709/220 |

FOREIGN PATENT DOCUMENTS

| | | |
|---|---|---|
| JP | 744477 | 2/1995 |
| JP | 879847 | 3/1996 |
| JP | 08221222 | 8/1996 |

* cited by examiner

*Primary Examiner*—Joseph H. Feild
*Assistant Examiner*—Chau Nguyen
(74) *Attorney, Agent, or Firm*—Antonelli, Terry, Stout & Kraus, LLP

(57) ABSTRACT

A device includes a self-information memory to store therein function data for other devices to operate the pertinent device and device name data thereof. Receiving a request from another device for the device name or function data, the device sends the data stored in the self-information memory. When function data is thereafter received, the device executes an instruction indicated by the data. In case where a plurality of devices each including the self-information memory are connected to each other via a bus or the like in a form of a network, at least one of the devices, i.e., a master device includes in addition to the self-information memory a connected device memory to store therein device name data of all of the connected devices and a communication pair memory to store therein function data of the communication partner. The master device requests the other devices for device name data thereof. When the requested data is received, the master device stores the data in the connected device memory. Consequently, by referring to the device name data stored in the memory, the control device recognize the device name of the connected device. Moreover, the master device requests the other devices for function data thereof. When the requested data is received, the master device stores the data in the communication pair memory. Therefore, by referring to the data stored in the pair memory, the master device recognize the function of the communication partner. In consequence, when a function is selected and function data related thereto is sent to a communication partner, the function can be accordingly executed.

12 Claims, 15 Drawing Sheets

INFORMATION DEVICE, INFORMATION DEVICE SYSTEM CONTROL METHOD, AND INFORMATION DEVICE SYSTEM

This is a continuation of application Ser. No. 08/996,142, filed Dec. 22, 1997.

BACKGROUND OF THE INVENTION

The present invention relates to devices such as audio-visual (AV) devices and personal computers (PCs) capable of recording and playing data of images and sound and devices having a function to receive and to transmit data of images and sound, and in particular, to devices having a function to enable, in a situation in which a plurality of devices are to be connected to each other, the user to connect the devices to each other without paying attention to a connection sequence thereof and to remotely control, by operating an arbitrary one of the connected devices, the other devices.

Recently, audio-visual devices have been broadly put to use and hence it is an ordinary practice that one user possesses several devices including a CD player, a television set (TV set), and a video player (VCR). Among the users, there has been increasingly desired to mutually connect these AV devices to each other so as to construct a so-called AV system. Consider a case as an example in which a VTR, a TV set, and a satellite broadcasting receiver are to be connected to each other. For example, or when video signals of a satellite broadcasting receiver are desired to be recorded in a VTR, it is necessary to connect an output jack of the satellite broadcasting receiver to an input jack of the VTR. Moreover, when video signals received by a satellite broadcasting receiver are desired to be displayed on a TV set, it is required to connect an output jack of the satellite broadcasting receiver to an input jack of the TV set. Additionally, there exists a problem of operability. In the present stage of art, the user can operate almost any such devices by a remote controller, which consequently leads to an undesired situation. Namely, there are arranged on a desk of the user as many remote controllers as there are the connected devices.

To solve the second problem above, various ideas have been proposed. For example, in accordance with a method described in JP-A-8-79847, there is prepared a remote controller including a liquid crystal display and all of the connected devices are beforehand registered to the remote controller such that the user touches an icon of one of the registered devices displayed thereon to thereby operate the device. Thanks to technology of the remote controller, all devices can be controlled by only one remote controller.

However, when the remote controller proposed in JP-A-8-79847 is adopted, there arises a problem that the user is required to beforehand register the icons of the connected devices to the remote controller and it is also necessary to register functions (such as recording and reproducing functions) that the respective devices have to the remote controller via an IC card and/or a telephone line so as to be stored therein. Additionally, the problem that users have to consider connection sequence, which was stated earlier, cannot be removed by the remote controller of the prior art.

SUMMARY OF THE INVENTION

It is therefore an object of the present invention to provide a system and a device in which the user can connect devices to each other without paying attention to a method of connecting the devices to each other and without registering functions and the like of the devices and the user can easily and arbitrarily operate the connected devices.

To achieve the object above, there is provided in accordance with the present invention a system in which each of the devices to be connected includes an own device name memory to store therein device name data thereof and an own function memory to store therein function data indicating functions thereof. Furthermore, at least one of the connected devices includes a connected device memory to store therein device data items of all of the connected devices, a communication pair function memory to store therein functions of two devices communicating data therebetween, and display means such as a liquid crystal display in a remote controller or in a housing of the pertinent device or a display connection jack to connect a display thereto so that device name data and function data received from other devices are displayed thereon and a function selected therefrom is sent to a device selected therefrom to thereby operate the other devices. In this regard, it is assumed that the memory above indicates a storage or storage means.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
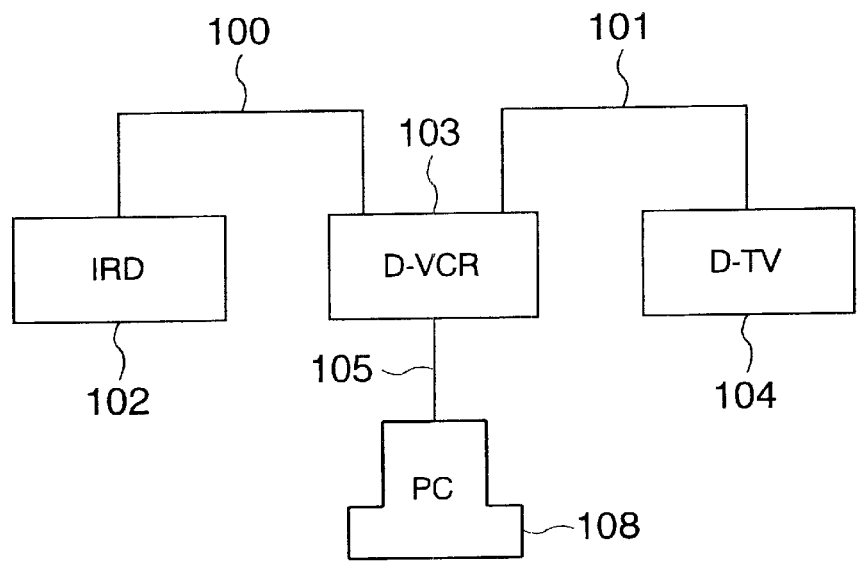
FIG. 1 is a block diagram showing an example of connection of AV devices and a PC.

FIG. 1 shows a configuration in which a digital satellite broadcasting receiver (IRD) 102, a digital video cassette recorder (D-VCR) 103, a digital television set (D-TV set) 104 for receiving a digital video signal and conducting processing such as a decoding of the signal to display an image thereof, and a personal computer (PC) 106 are connected to each other via cables 100, 101, and 105.

Incidentally, in this embodiment, the interface between the cables 100, 101, and 105 and the connected devices are a bus interface, e.g., an international standard IEEE1394 which conforms to a protocol to recognize a connection state in accordance with an ID number, an address, and the like. However, the interface is not restricted by the IEEE1394, namely, the digital interface may be achieved by a USB, an SSA, a fiber channel, an FC-EL, or an SCSI.

In conjunction with the embodiment above, description will be given of a case in which a job to record a grand wave of a digital image received by the D-TV 104 in the D-VCR 103 is accomplished by operating the IRD 102. First, FIGS. 2 and 3 will be described.

Figure 2:
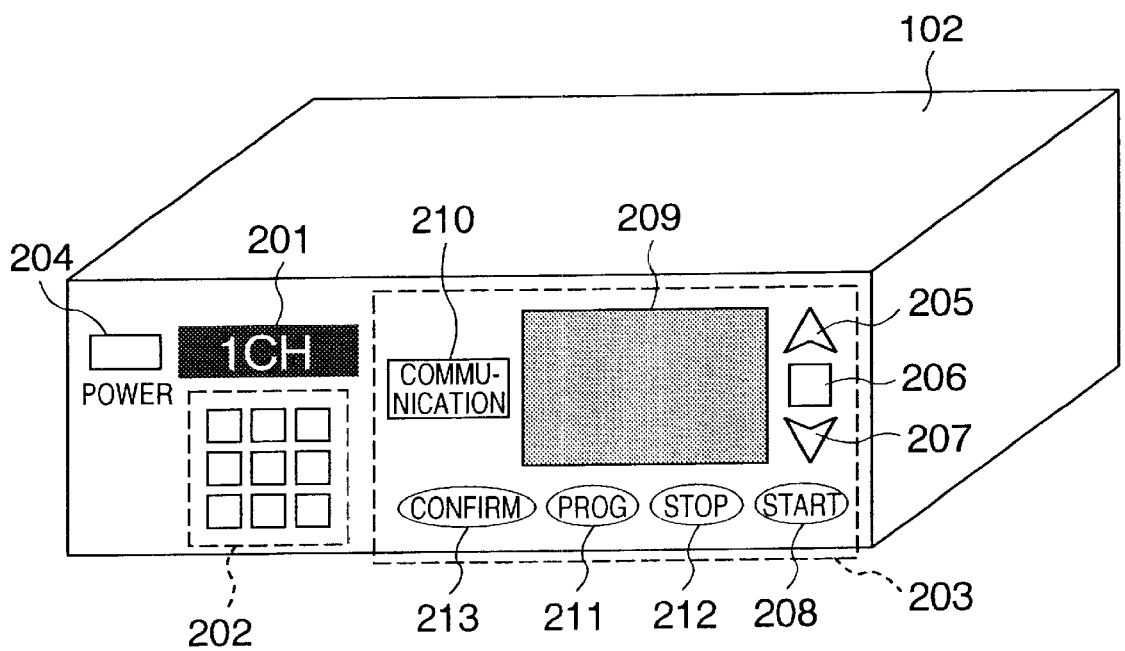
FIG. 2 is diagram showing an appearance of an IRD.

FIG. 2 shows an appearance of the IRD 102. This configuration includes a reception channel display LCD 201 for displaying a channel being used for reception, a group of buttons 202 for selecting a channel, and a group of operation buttons and a display section (to be referred to as a communication mode section herebelow) which are employed to operate the IRD in a communication mode.

Numeral 204 indicates a power button, 205 and 207 are cursor move buttons to move a cursor displayed on the communication mode display LCD 209, 206 denotes a selection button to change an item to be displayed at a position of the cursor, 210 indicates a communication mode button to operate the IRD in the communication mode, 211 denotes a communication program button to display and to confirm setting items to set a plurality of communications, 212 designates a stop button to terminate communication, and 213 is a communication confirmation button to confirm a communication state.

Figure 3:
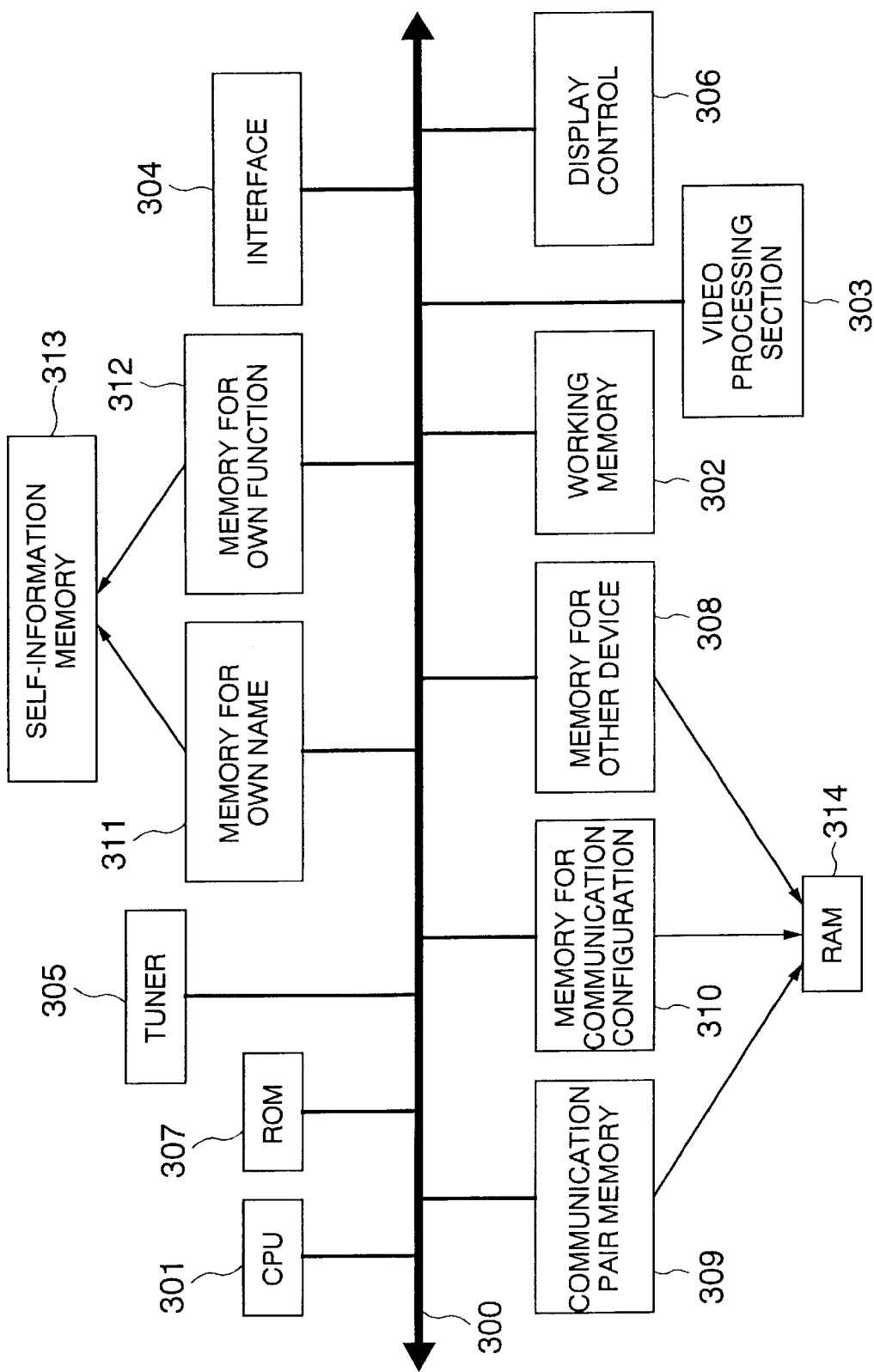
FIG. 3 is a block diagram showing the circuit configuration of an IRD (Integrated Receiver Decoder)

FIG. 3 briefly shows the internal circuit configuration of the IRD 102 including a bus 300 of a CPU 301 in the IRD 102, the bus being connected to essential means such as a memory. Exchanges and other handling of data, which will be next described, are accomplished under control of the CPU 301. Numeral 302 denotes a working memory (e.g., an RAM) used by the CPU 301 to execute processing, 303 indicates a video processing section to achieve processing such as decoding of and DA conversion of received video data, and 304 is a digital connection interface section conducting processing for digital connection to another device in conformity with a protocol (e.g., IEEE1394).

Numeral 305 indicates a tuner section to receive a signal sent from a satellite, 306 denotes a communication mode screen display control section to control characters and the like displayed on the communication mode display LCD 209 disposed in a front panel of the IRD 102, 311 indicates an own device name memory to store therein device name data of the IRD 102, and 312 is an own function memory to store therein function data of the IRD 102. In this regard, the "device name" in this paragraph indicates a name of a device itself such as IRD or D-VCR.

Numeral 307 is non-volatile storage means (ROM) in which a program to control the overall operation of IRD 102 is stored. Numeral 308 indicates a connected device memory to store therein device names and ID numbers or addresses of all devices connected to a bus or a network linked with the IRD 102, 309 designates a communication pair function memory to temporarily store therein functions of a pair (including two devices on the sender and receiver sides) communicating with each other, and 310 is a communication configuration memory to store therein the configuration of communication started.

Figure 4:
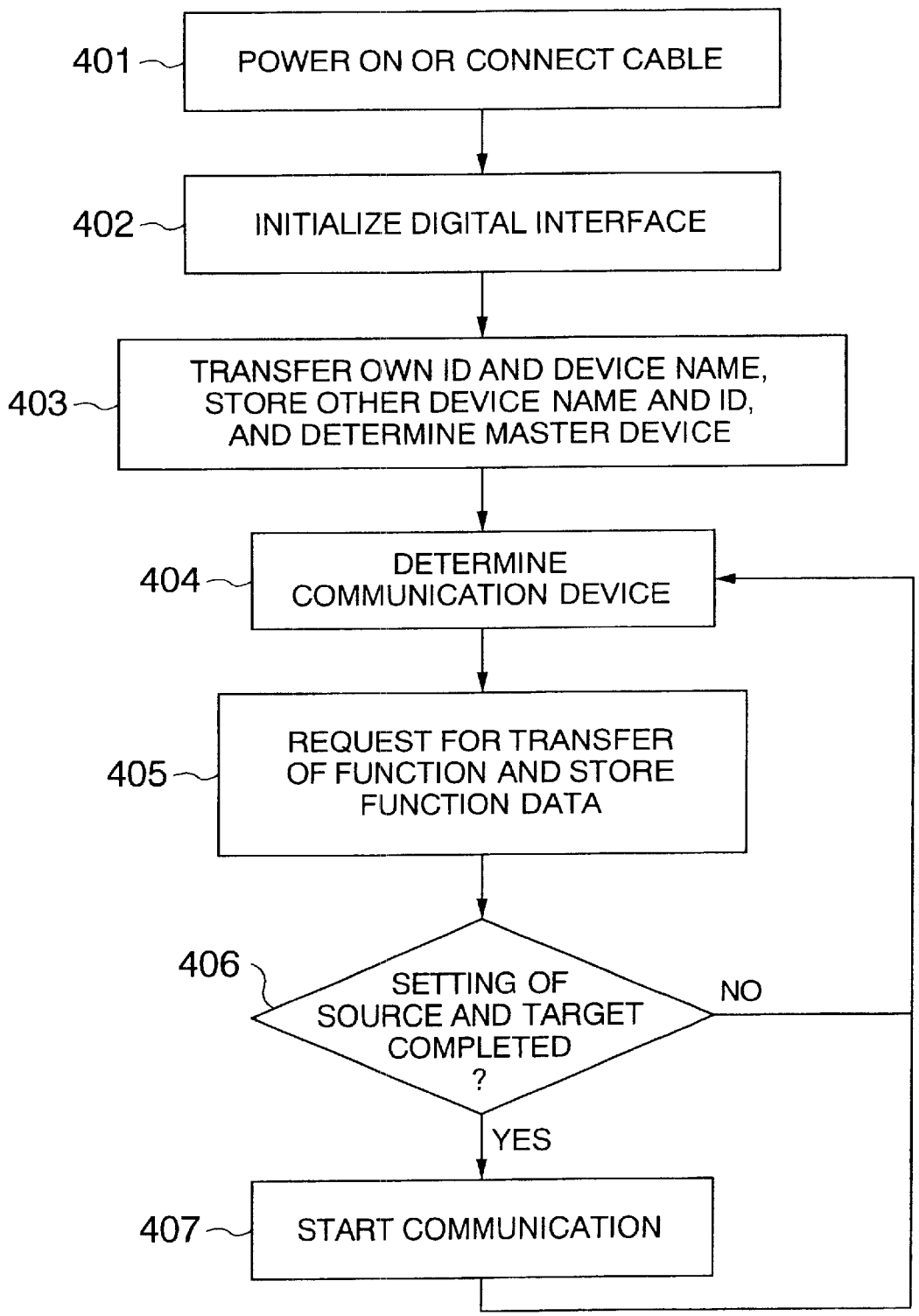
FIG. 4 is a flowchart for explaining operation of a control device.
Figure 5:
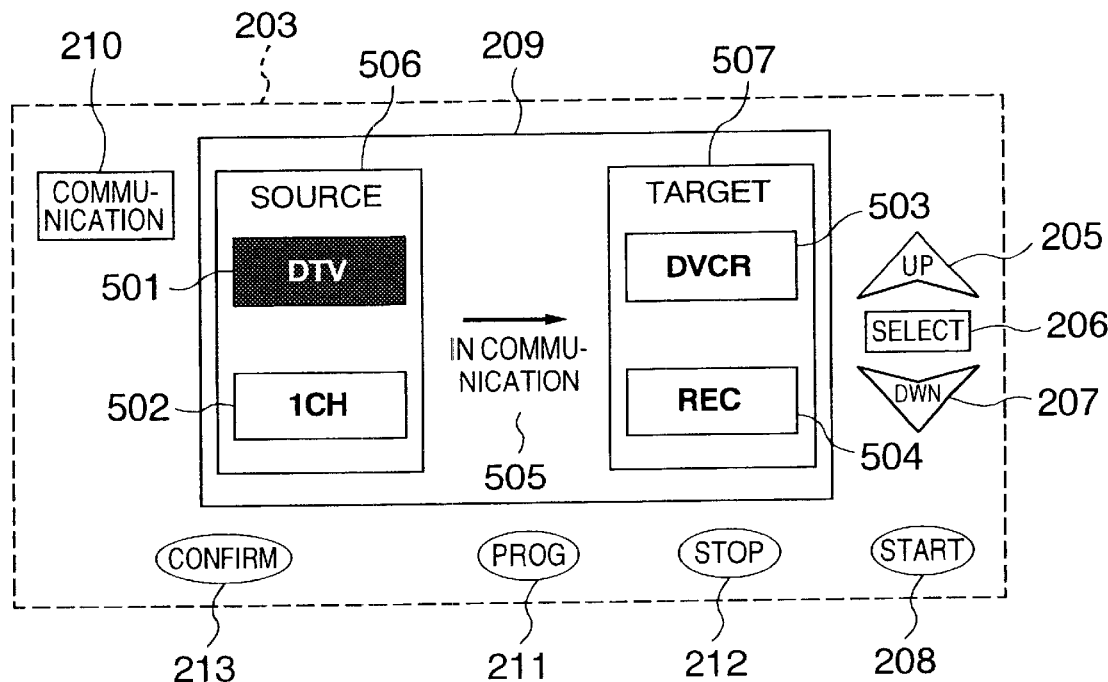
FIG. 5 is a diagram showing an example of the communication mode section.

Description will be next given of a case in which a job to record video data received by the D-TV 104 in the D-VCR 103 is accomplished by operating the IRD 102 as above by referring to a flowchart of FIG. 4 and a magnified diagram of FIG. 5 showing the button group and a display section 203 to be used to operate the IRD 102 in the communication mode. In this connection, since the other devices are operated by the IRD 102, the IRD 102 will be referred to as a master device. It is additionally assumed that the connected D-VCR 103, D-TV 104, and PC 106 each have constituent circuits equivalent to at least the own function memory 312, the own device name memory 311, and the connection interface 304 of the internal block circuit configuration of IRD 102 shown in FIG. 3.

First, when connected to the cable or powered (phase 401), the IRD 102 is initialized in accordance with the specification of the digital interface of the cable (phase 402). In this operation, an ID number is determined for each of the connected devices.

In this case, the ID number is determined, for example, in accordance with the international standard IEEE1394 as follows. Parent relationships are determined for all connected devices as stipulated by the international standard IEEE1394 (IEEE standard for a High Performance Serial Bus), and each of the devices as leaves (devices that have no children) sequentially determines its own ID number (node number) to notify the number to the other devices.

In this embodiment, the IRD 102, D-VCR 103, D-TV 104, and PC 106 are assumed to be assigned with ID numbers "102", "103", "104", and "106", respectively.

Next, control is passed to phase 403 in which the own device name is reported to the other devices.

There can be considered two methods of reporting the own device name to the other devices.

In the first method, after the interface is completely initialized in phase 402, the device transfers the own ID number assigned thereto and the own device name stored in the own device name memory 311 via the interface 304 to the other connected devices (which is called a broadcast transfer in the IEEE1394). In this method, each of the connected devices having the connected device memory receives at this point of time device name data of the other devices and stores the data in the connected device memory 308 thereof and hence can memorize all device names of the connected devices. For example, in this embodiment, each of the devices including IRD 102, D-VCR 103, D-TV 104, etc. transmits the own device name via the connection interface to the other connected devices to resultantly memorize all device names of the connected device.

In the second method, after the interface is completely initialized in phase 402, the devices enter an idling state (waiting for requests) such that when the pertinent device receives request data for device name data via the interface 304 in this state, the device transfers the device name thereof to the requesting device. For example, in this embodiment, the IRD 102 issues the device name request to the D-VCR 103, D-TV 104, etc. such that the IRD 102 receives device name data of all device names transmitted in response to the request and stores the data in the connected device memory 308 thereof. In this situation, the device name request data is transferred to the other connected devices when the communication mode button 210 of the IRD 102 is depressed.

The first method has an advantage that the period of time from when the user presses the communication mode button (selects the device as a control device) to when control is passed to the next phase is minimized. Conversely, the second method has an advantage that when the device is not selected as a master device, the device name data is not required to be received, which consequently saves the memory capacity.

Figure 6A:
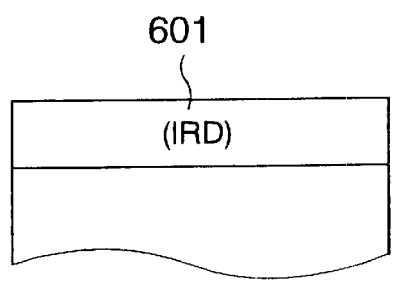
FIGS. 6A and 6B are diagrams showing an example of a method of storing data in a self-information memory.
Figure 21:
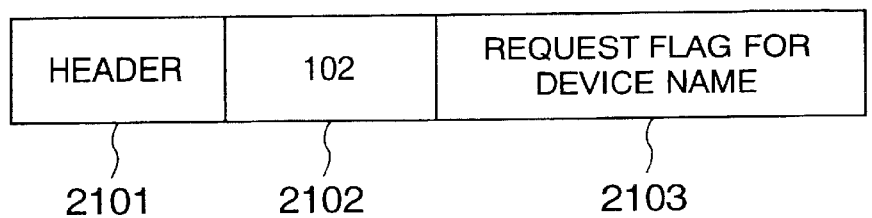
FIG. 21 is a diagram showing a data packet structure employed to transmit a device name data request.

FIG. 21 shows an example of a transfer data structure to request device name data. Numeral 2101 indicates header data conforming to the digital interface to connect the device and indicating that a device name data request flag 2103 follows the header data and 2102 denotes an ID number of the transmission source. There is stored in the own device name memory 311 display character data to display characters for easy understanding of the user as shown in FIG. 6A. Assume that character codes enclosed in parentheses are to be stored.

Figure 9:
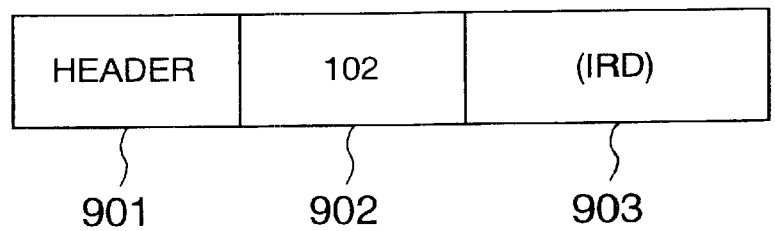
FIG. 9 is a diagram for explaining a packet structure used to transfer an ID number and device name data.

FIG. 9 shows an example of a transmission data layout or structure used to transfer an ID number and a device name to other devices. Numeral 901 is a header conforming to the protocol of the digital interface and indicating that device name data follows the header data, 902 denotes an ID number of the device, and 903 indicates device name data thereof. Incidentally, to correctly display display character data on the receiver side, there is required means to transform the character data into characters on the receiver side. In the IRD 102, the communication mode screen display control section 306 of FIG. 3 conducts the operation to display the data on the communication mode LCD 209.

In phase 403, a device having a connected memory 308 (i.e., a device which can operate as a master device) transmits the device name and the ID number of the device. On the other hand, the device receives an ID number and a device name transmitted from the other device to store these items (together with the own device name and the own ID number) in the connected device memory 308. However, in a case where the control device issues the request to the other devices for the device name data (the second method of transferring device name data), at least the own device name is not required to be transmitted.

Figure 7:
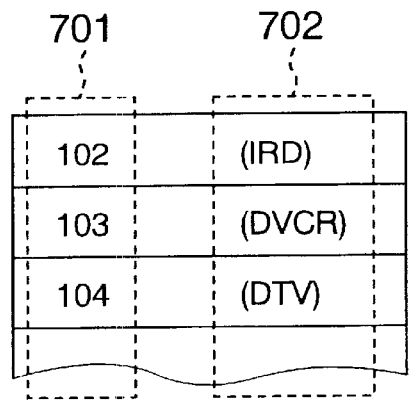
FIG. 7 is a diagram showing a method of storing data in a connected device memory.

As can be seen from FIG. 7, the ID number 701 and the device name character display code 702 corresponding thereto are stored in the connected device memory 308. Parentheses associated with numeral 702 means that the character codes enclosed between the parentheses are to be displayed. Through the operations up to this point, the preparation for determining a device to transmit data and a device to receive data has been completed.

In this connection, although FIG. 6A shows a data storage example in the own device name memory 311, it may also be possible that an area of one memory (self-information memory 313) is subdivided into an own device name memory area and an own function memory area as shown in FIG. 3. In other word, the storage areas may be changed in accordance with kinds of data to be stored therein.

Figure 6B:
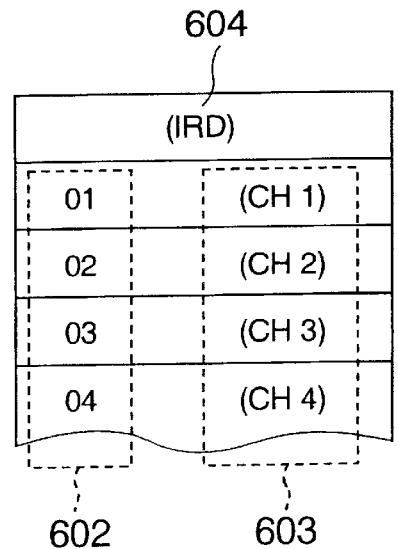

FIG. 6B shows a data storage example of the self-information memory 313. Numeral 604 is an own device name memory area and 602 and 603 indicate a remaining area used as a self-function memory domain or an own function memory area. Numeral 604 is an own device name data and 602 denotes a function flag, i.e., a command number. When the data of the flag is received from an external device, there is executed a function corresponding thereto. Numeral 603 indicates a function name to display characters to concretely notify the function of the function flag 602 to the user. As parentheses 601, parentheses 603 and 604 indicate that the character codes enclosed therebetween are to be stored.

Thereafter, control is passed to phase 404 to determine a pair including a source device and a target device for data communication. It is assumed in this paragraph that the source device is a device on a side from which information is transmitted and the target device is a device for receiving information from the source device. Phases 404 to 407 will be next described by referring to FIG. 5 showing a magnified view of the communication mode section 203 of the IRD 102.

Since the communication mode button 210 is pressed in the preceding phase, the communication mode is on in the system. Therefore, the cursor is displayed at a position 501 in a source side area 506 displayed on the communication mode display LCD 209. Incidentally, when the button 210 is not pressed, the communication mode is off and hence the IRD 102 is operated as a single device such that the button group 202 of FIG. 2, a remote controller associated with the device, or the like are operated to set a channel.

When the user depresses the selection button 206, the device names (702 of FIG. 7) stored in the connected device memory 308 are sequentially displayed at the position 501. When "D-TV" is presented, the pressed state of the button 206 is released. In consequence, the cursor move button 207 is pressed to move the cursor to the position 502. Since the cursor is moved from the position 501, it is assumed that D-TV 104 is selected as a source device and a request is issued to the D-TV 104 in accordance with the ID number (104 of FIG. 7) of the D-TV 104 stored in the memory 308 for function data (a flag to execute a function of D-TV by an external operation and a character code representing the function). When the function data of D-TV required is received, the device stores the data in the communication pair function memory 309 (phase 405).

Figure 22:
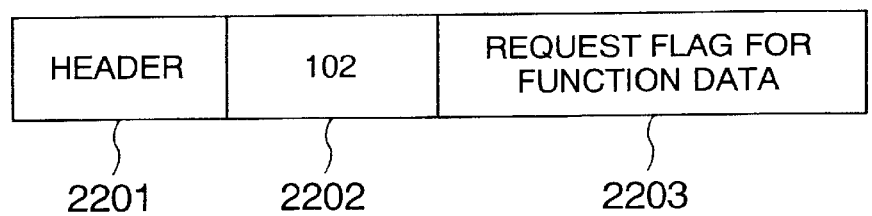
FIG. 22 is a diagram showing a data packet structure used to transmit a function data request.
Figure 23:
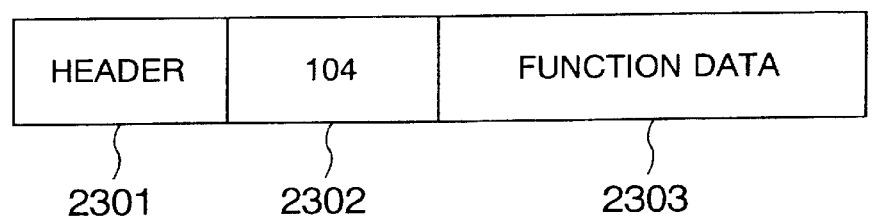
FIG. 23 is a diagram showing a data packet structure adopted to transmit function data.

FIGS. 22 and 23 respectively show a transmission data structure example and a function data structure example related to the function data request. Numeral 2201 of FIG. 22 is a header conforming to the standard of the digital interface to connect the device and indicating that a request flag for function data follows the header, 2202 indicates an ID number of the transfer source of data, and 2203 denotes a function data request flag. Additionally, numeral 2301 of FIG. 23 designates a header conforming to the standard of the digital interface to connect the device and indicating that function data follows the header, 2302 indicates an ID number of the transfer target of data, and 2303 is function data.

Since the D-TV 104 includes, like the IRD, the own function memory, when a request signal for function data is received, the D-TV 104 transfers data (function data) stored in the own function memory to the IRD 102.

Figure 8:
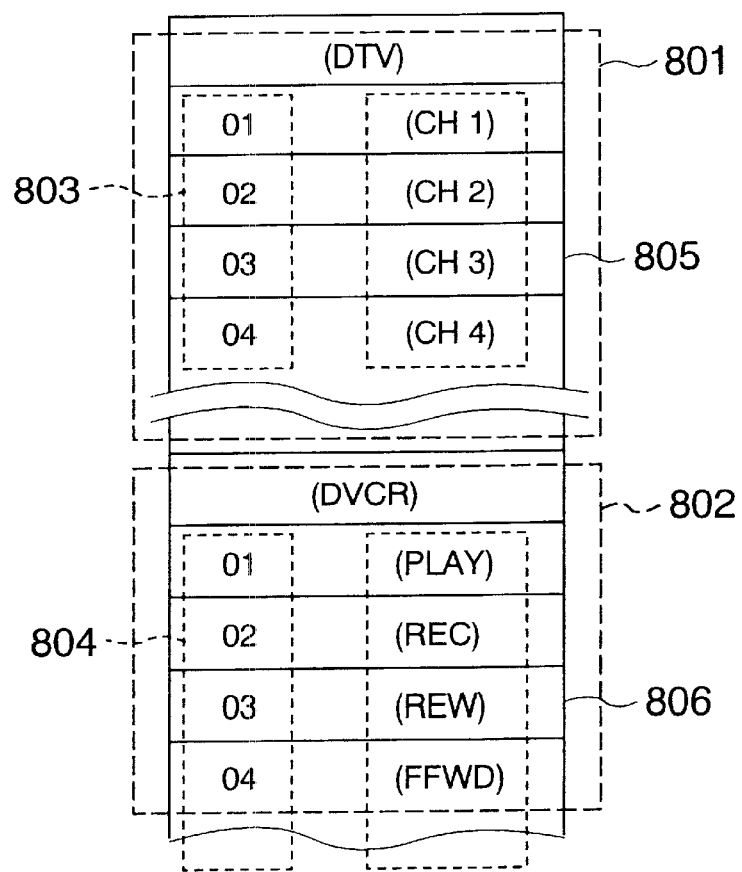
FIG. 8 is a diagram of a method of storing data in a communication pair function memory.

FIG. 8 shows a data storage example in the communication pair function memory 309. In the memory 309, the function flags 803 and 804 and the character code data items 805 and 806 for representing the flags 803 and 804 are separately stored in a data area for a source device 801 (upper-half portion enclosed in a dotted line in FIG. 8) and a data area for target device 802 (lower-half portion enclosed in a dotted line in FIG. 8). Incidentally, there may be arranged memories separately for the source and target devices for the storages. By depressing the selection button 206, character data 805 of function data stored in the source device area 801 is sequentially displayed in the cursor area 502 of FIG. 5. When a desired function is displayed, the user releases the pressed state of the button 206. This completes the setting of the source device (phase 406).

Next, control returns to phase 404 to determine the target device. The cursor is moved to the position 503 in the target device display area 507 by pressing the cursor move button 205 or 207. The target device and a function thereof are determined in a manner completely similar to that of the operation conducted in association with the source device to select the desired device and function (phases 404 and 405). However, the target device area 802 is used for the communication pair function memory 309. Incidentally, the example of FIG. 5 shows an operation to record data of channel 1 of the D-TV 104 in the D-VCR 103.

When the source and target devices and the functions thereof are completely selected (phase 406), the user finally depresses the start button 208 (phase 407) and hence an instruction "select channel 1 and transmit data to ID 103 (D-VCR)" is transferred to the D-TV 104 and an instruction "receive and record (record picture) data transmitted from ID 104 (D-TV)" is transferred via the digital interface to the D-VCR 103.

Figure 12:
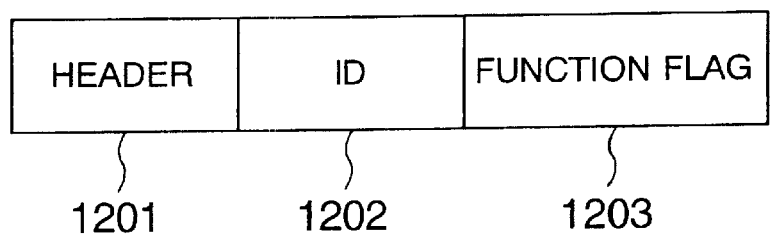
FIG. 12 is a diagram for explaining a packet utilized to transfer an ID number and a function flag.

In this operation, the data transmitted from the IRD 102 includes the function flag 1203 and the ID number 1202 of the communication partner as shown in FIG. 12. Namely, to the D-TV 104, the ID number of D-VCR 103 is set in the ID field 1202 and the command number 01 to receive channel 1 is set in the function flag field 1203. Furthermore, for the D-VCR 103, the ID number of D-TV 104 is set in the ID field 1202 and the command number 01 (the command number is "02" corresponding to the video recording function as indicated by numeral 804 of FIG. 8 in this embodiment) to record video data is set in the function flag field 1203.

As a result of the operations above, each device can recognize the data transfer target and source. In this regard, a field 1201 is header data conforming to the protocol of the digital interface to connect the device and indicating that data following the header data is a function flag.

When the communication is started at this point, a character string 505 of FIG. 5 "in communication" indicating that the communication is in process may be displayed on the communication mode display LCD 209. A timer function may be provided in the control device (the IRD 102 in this case) so that the communication start and end points of time are set by pressing a timer button, not shown, before the communication start button. In this case, however, at the point of time established as above, the master device transfers the function flag in a packet of FIG. 12.

When the user depresses the communication start button, the configuration data and ID number of each device at the starting point are stored in the communication configuration memory 310. When setting the communication pair, either one of the source and target devices may be first set.

In the case using the second method of transferring device name data (i.e., the method of transferring the own device name in response to a device name request), the request for device name data and the response thereto as well as the request for function data and the response thereto are respectively accomplished in the different phases (phases 403 and 405). However, it may also be possible that the device name data and the function data can be attained through one request. In other words, the master device transfers a request for function data including device name data to the other devices. Receiving the request, each connected device transmits the own device name data together with the own function data. The master device receives the transmitted function data including the device name data, separates the data into the device name data and the function data, and stores these data items in the connected device memory 308 and the communication pair memory 309, respectively.

Figure 24:
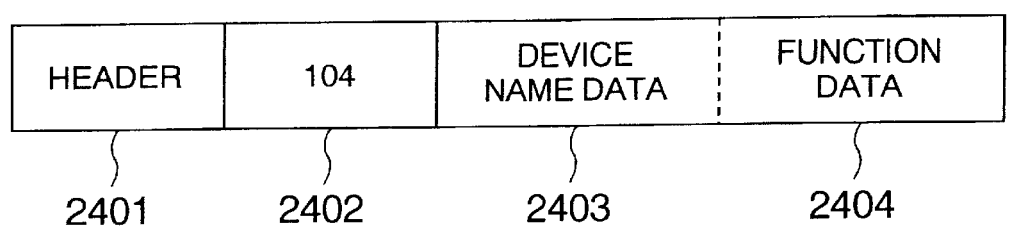
FIG. 24 is a diagram showing a data packet structure utilized to transfer device name data together with function data.

FIG. 24 shows a data structure example in which the function data including the device name data is transmitted. Numeral 2401 is a header which conforms to the standard of the digital interface and which indicates that device name data 2403 and function data 2404 follow the header and numeral 2402 denotes an ID number of the transmission source.

After there is established the communication to record pictures on channel 1 of the D-TV 104 in the D-VCR, the user may desire to establish another communication, for example, for reservation of recording in which a program received by the IRD 102 is to be recorded by the D-VCR 103. This operation to additionally configure a communication can be carried out by depressing the communication program button 211. In response to the pressing of the button 211, characters indicating a configuration of the next communication is displayed on the display LCD 209 as indicated by numeral 1001 in FIG. 10 and then a new setting screen is displayed. Setting the source and target devices, the second communication can be started in a manner completely identical to that used to configure the first communication. Repeatedly achieving the operation above, there can be started a plurality of communications such as the third communication, fourth communication, and so on.

Figure 14:
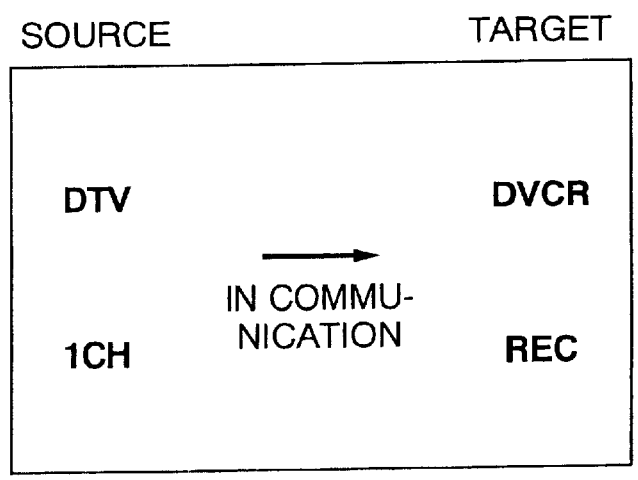
FIG. 14 is a diagram for explaining a display screen when a communication confirmation button is pressed.

When the user depresses the communication confirmation button 213 after the communication is started, the communication configuration stored in the communication configuration memory 310 is displayed on the LCD 209 as shown in FIG. 14. When the stop button 202 is pressed in this situation, a signal "stop communication" is transmitted to the D-TV and D-VCR in accordance with the IDs thereof stored in the memory 310 to resultantly stop the communication.

In this regard, the description has been given from the standpoint of the RID 102, i.e., the master device. Next, description will be given from a viewpoint of the devices to be controlled. In this case, the D-VCR 103 will be used for the description.

Figure 11:
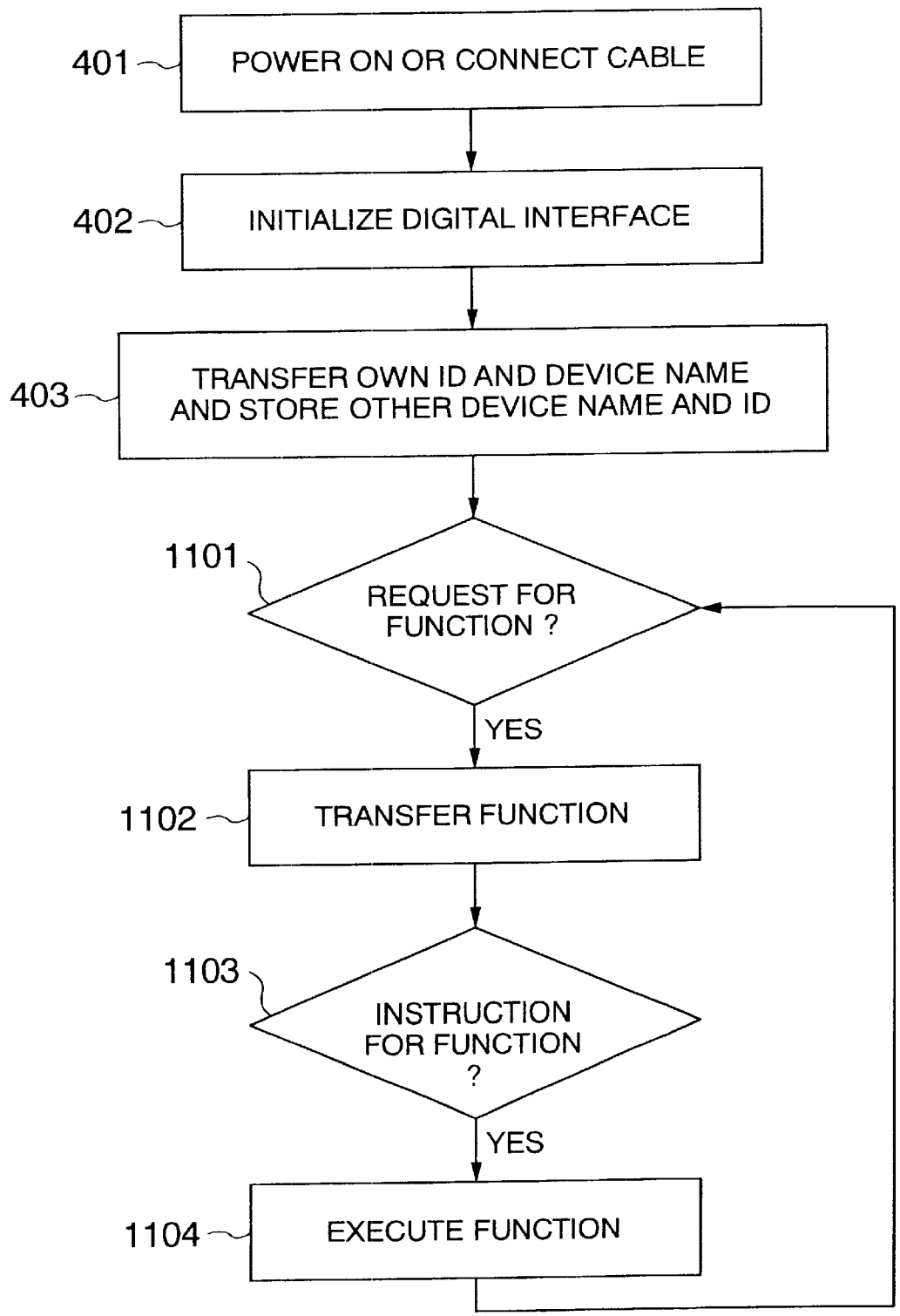
FIG. 11 is a flowchart showing operation of a connected device other than the control device.

FIG. 11 is a flowchart showing an operation in which the D-VCR 103 (slave device) is controlled by the master device. Phases 401, 402, and 403 are the same as for the case of the control device and hence description thereof will be avoided.

In phase 1101, the device awaits a request from another device for function data. On receiving a function data request, the device transfers the function flag stored in the own function memory and display character data thereof to the requesting device (phase 1102) and then awaits reception of a function flag (functional command) transmitted therefrom (phase 1103). The master device sends the functional command in the data structure shown in FIG. 12. On receiving the command (function flag), the device executes a function (e.g., recording of picture) assigned to the flag (phase 1104).

Incidentally, the ID number of the data transmission source (D-TV in this case) is also received together with the function flag as shown in FIG. 12. Therefore, the D-VCR 103 can recognize the source of the received data. After the function is executed, the device awaits again a function request signal in phase 1101 to prepare for the next communication.

As described above, each of the connected devices includes the own device name memory 311 and the own function memory 312 (or the self-information memory 313); moreover, at least one of the devices includes the connected device memory 308 and the communication pair function memory 309. Consequently, by operating only one of the devices (including the connected device memory 308 and the communication pair function memory 309), the user can operate the other connected devices.

In this regard, it is not necessarily required to separately arrange the connected device memory, the communication pair function memory, and the communication configuration memory. Namely, one memory (RAM 314 of FIG. 3) may be subdivided into areas to be used as these memories. Similarly, the contents stored in the own function memory, the own device name memory, and the program ROM are information items not to be rewritten. Therefore, the memories need not be arranged as separate memories, namely, it may be possible to subdivide one memory into areas for these memories.

Furthermore, the communication mode display LCD may be configured as follows.
(1) Although the source and target devices are set on the same screen (in which the setting items for source and target devices are simultaneously displayed) in the description above, the screen to set the target device may be displayed after the source device is completely set.
(2) Liquid crystal displays (LCDs) are separately disposed to set the source and target devices so that the setting operation of the source device and that of the target device can be separately selected.
(3) The communication mode display LCD is disposed on the remote controller, not on the device as shown in FIG. 2.

Figure 25:
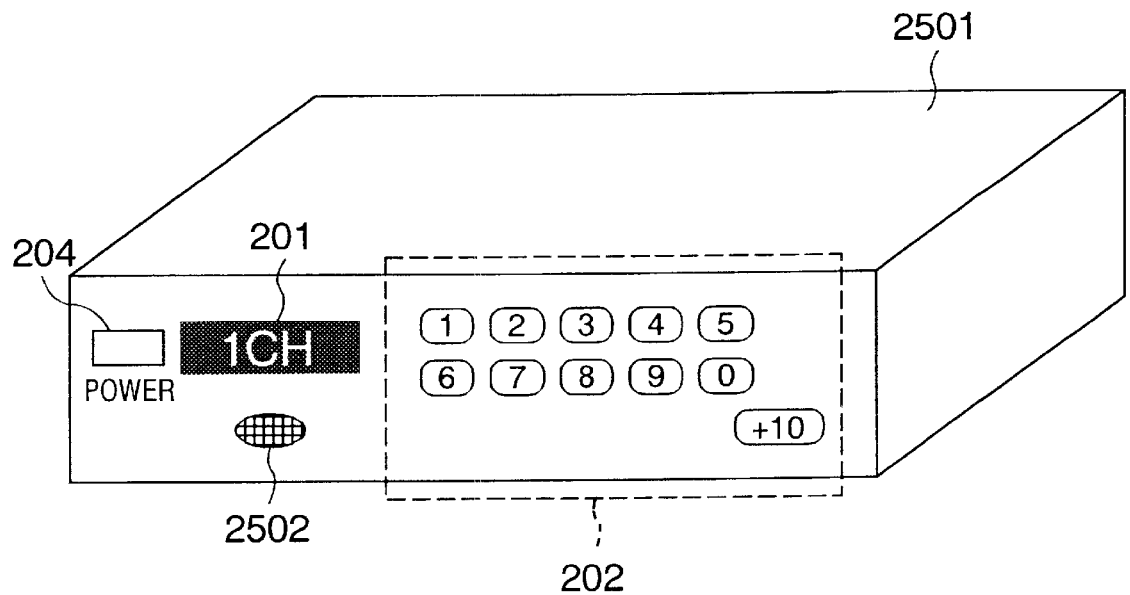
FIG. 25 is a perspective view showing an appearance of an IRD not including a communication mode display LCD.
Figure 26:
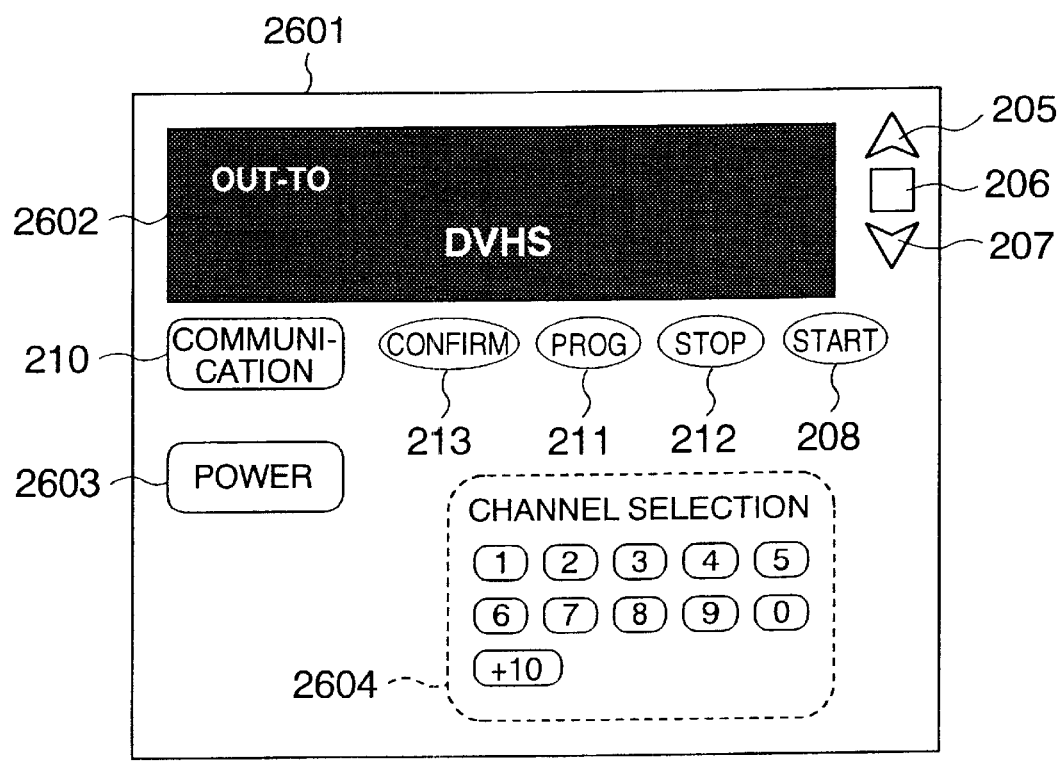
FIG. 26 is a front view of a remote controller of an IRD.

FIGS. 25 and 26 respectively show examples of the main section of IRD and the remote controller in the case of article (3) above. Numeral 2501 is a main section of IRD in which the communication mode display LCD is not entered and 2502 denotes a light receiving section to receive a signal from a remote controller. A remote controller 2601 includes a communication mode display LCD 2602 (corresponding to the LCD 209), a button 2603 to control power of the IRD, and a group of buttons 2604 to control a reception channel (202) of the IRD. The other components assigned with the same numerals as those of FIG. 2 are the same as those of FIG. 2 and achieve the same operations.

Figure 10:
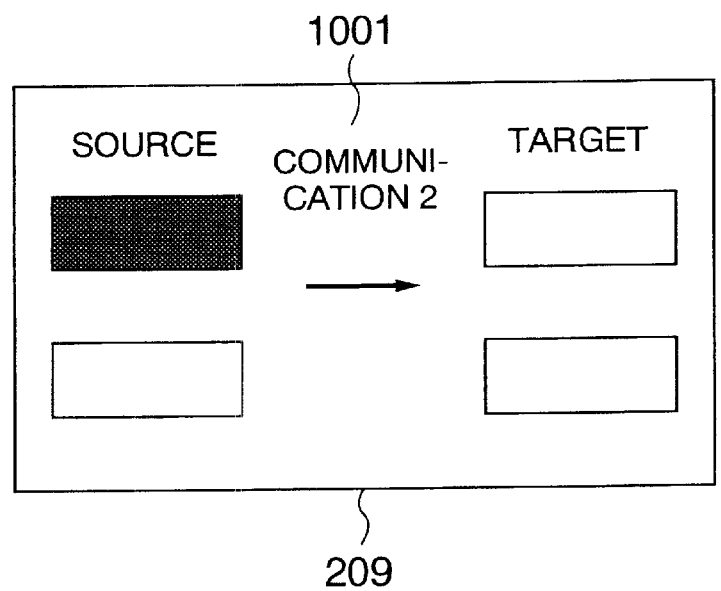
FIG. 10 is a diagram for explaining a communication mode display LCD.

Additionally, when a device like the D-TV 104 having a display to display video data thereon is assigned as the master device, the communication mode display LCD 209 is not required not be disposed in addition to the display for the video data, namely, the communication configuration menu screens shown in FIGS. 5 and 10 may be displayed on the same display.

Figure 13:
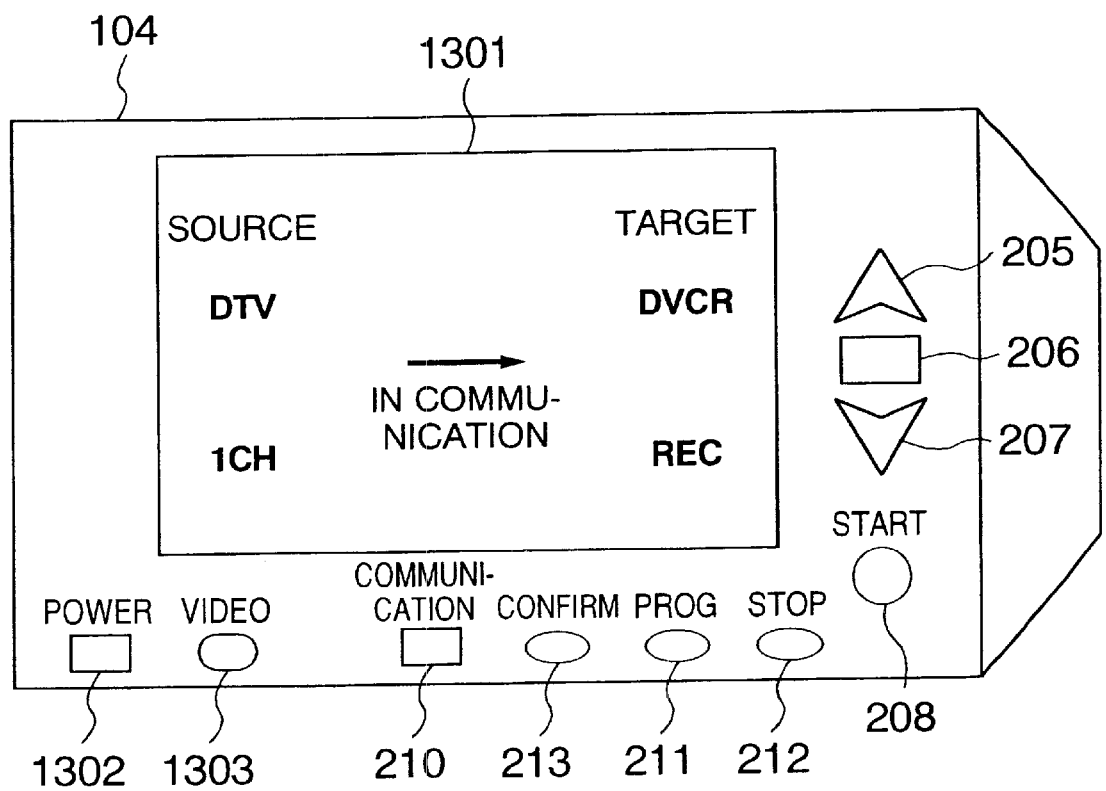
FIG. 13 is a diagram showing a communication mode setting display screen of a D-TV.

FIG. 13 shows an example of appearance of the D-TV 104 configured as above. Numeral 1301 is a display to display thereon received video data and a communication configuration menu, 1302 denotes a power switch, and 1303 indicates a video button to display received video data. The other buttons are used for the same functions as those described in conjunction with FIG. 2 (and are assigned with the same numerals).

When the user depresses the communication mode button 210, the D-TV 104 becomes a control device and the communication configuration menu is displayed on the display 1301. The source and target devices are set by pressing the cursor move buttons 205 and 207 and the selection button 206 and then the communication is started by the start button 208. When the video button 1303 is pressed, the communication mode display screen is changed to the ordinary received video display screen on the display 1301. When another communication is to be established, the communication mode button 210 is again pressed. That is, the D-TV 104 has two screen display modes for the received video display and the communication mode display, which can be changed by the buttons 210 and 1303.

In relation to the embodiment described above, description has been given of an example in which the data stored in the own device name memory 311, the own function memory 312, and the self-information memory 313 is character data (as shown in FIGS. 6 to 8) such that each connected device converts the character data into characters to be displayed on the display.

Assume that there is employed, for example, character conversion or transform procedure A. Each device stores character codes conforming to character transform procedure A in the own device name memory, the own function memory, and the self-information memory. Each device may display received character data on the screen in conformity with character transform procedure A. However, when a connected device stores therein character codes not conforming to character transform procedure A and transmits the character codes to another device, there naturally occurs an event in which the character codes are not appropriately displayed. Consider utilization of other than the characters, i.e., pictures and symbols by slightly changing the viewpoint. That is, description will be given of an embodiment in which the connected devices of FIG. 1 adopts graphic display procedure A in place of character transform procedure A.

In conjunction this embodiment, description will be given of a case in which the D-TV 104 is operated to receive video via channel 2 of the IRD 102 so as to record the video in the D-VCR 103. In this operation, assume that the IRD-102, D-VCR 103, D-TV 104, and PC 106 each include a self-information memory 313 and store the device name data and the function data in accordance with a data format conforming to graphic display procedure A. Moreover, assume that the D-TV 104 additionally includes a communication configuration memory 310 and a connected device memory 308 as well as a communication mode screen display control section 306 which can display data conforming to graphic display procedure A on the screen and which can conduct operations associated therewith. Furthermore, assume in the embodying mode that the own device name data and the own function data are collected as self-information data to be stored in the self-information memory 313 and the self-information data (the own device name data and the own function data) is stored in the connected device memory together with the ID number, namely, the communication pair memory 309 becomes unnecessary.

Figure 16:
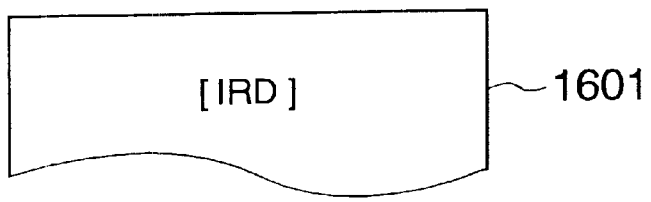
FIG. 16 is a diagram showing a method of storing data in a self-information memory.

FIG. 16 shows an example of self-information data stored in the self-information memory of the IRD 102. Numeral 1601 denotes self-information data obtained by transforming the device name data and the function data of IRD in accordance with graphic display procedure A. Parentheses indicate that self-information data of the device enclosed in the parentheses are beforehand transformed in accordance with graphic display procedure A.

Figure 15:
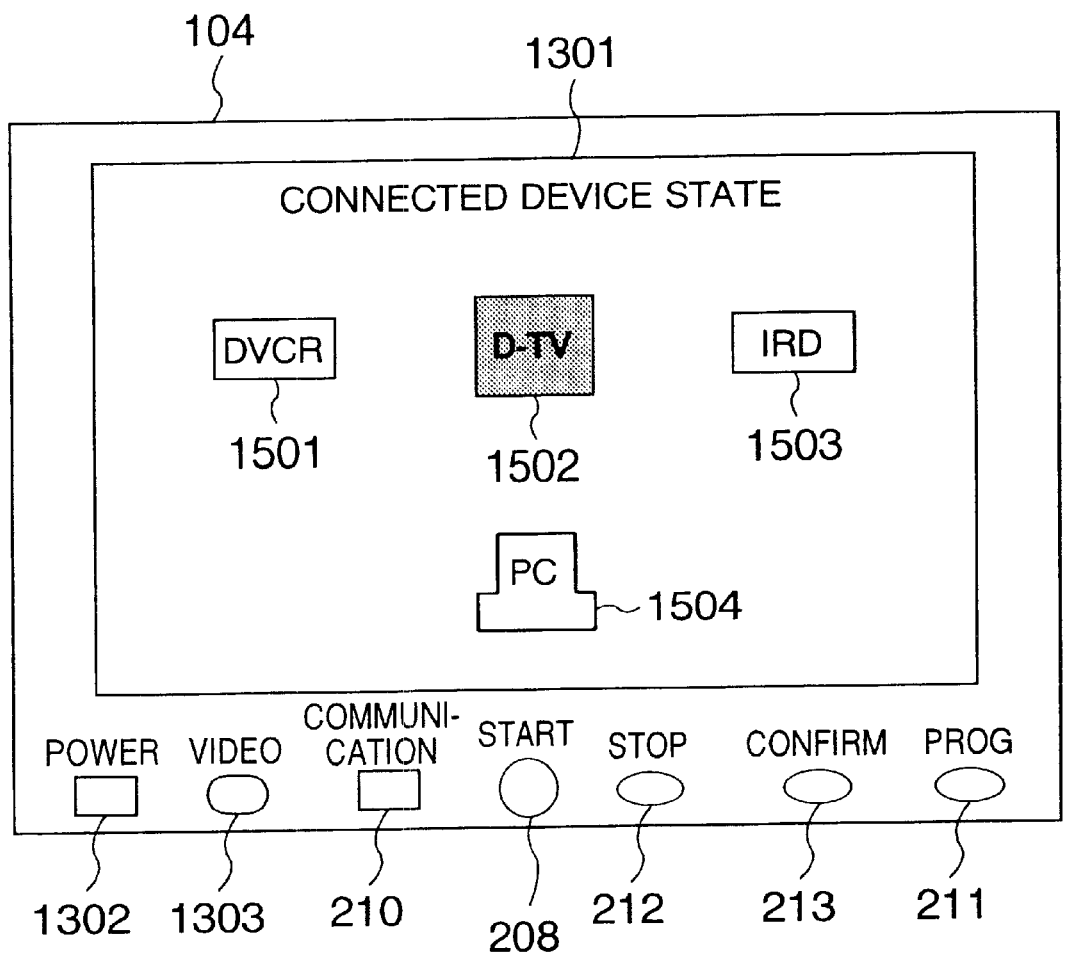
FIG. 15 is a front view showing an appearance of a D-TV.

FIG. 15 shows a second appearance of the D-TV 104, which is different from that shown in FIG. 13. Numerals without "15" at the beginning thereof have already appeared and hence will not be described. In the D-TV of FIG. 15, the user can select items by directly touching the screen, namely, there are not utilized the cursor move buttons 205 and 207 and the selection button 206 used in the D-TV of FIG. 13. When the selected cursor position is successively tapped twice, there is obtained the effect which is attained when the selection button 206 is depressed.

First, when the user depresses the communication mode button 210 shown in FIG. 15, the device, i.e., D-TV 104 is selected as the control device. The D-TV 104 requests the connected devices for self-information data. Receiving a response thereto (ID number and self-information data), the D-TV 104 stores the response in the connected device memory 308 thereof.

Figure 17:
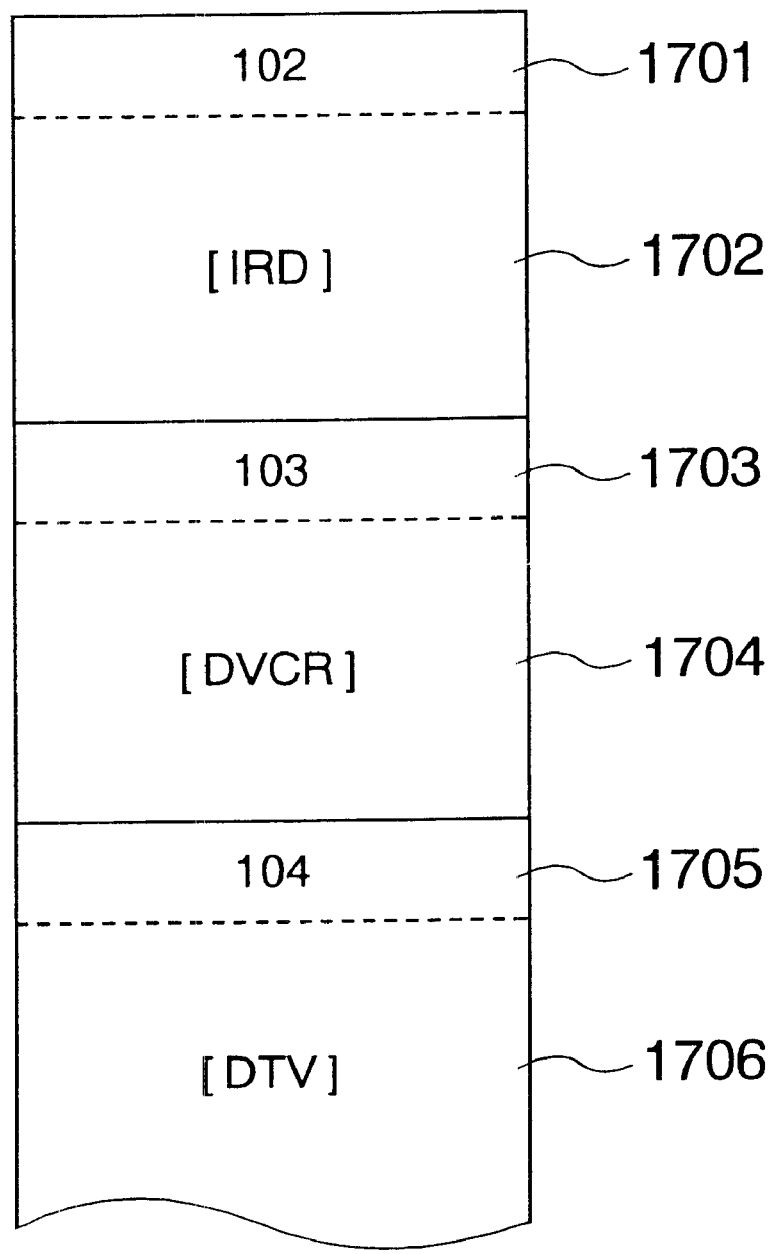
FIG. 17 is a diagram showing a data storage example of a connected device memory.

FIG. 17 shows a data storage example of the connected device memory. Numerals 1701 and 1702 respectively indicate an ID number and self-information data of the IRD 102. Similarly, numerals 1703 and 1704 respectively designate an ID number and self-information data of the D-VCR 103 and numerals 1705 and 1706 respectively designate an ID number and self-information data of the D-TV 104. As in FIG. 16, parentheses are used such that self-information data of the device enclosed in the parentheses are beforehand transformed in accordance with graphic display A.

After the ID number and self-information data of each connected device are stored in the connected device memory, the D-TV 104 reads the contents of the connected device memory 308 to inversely transform the obtained data in accordance with graphic display procedure A and then display the data on a screen. FIG. 15 shows a screen 1301 which is an example of the screen display at this point of time. Numeral 1501 indicates an item (to be referred to as an icon herebelow) representing device name data of the D-VCR 103, 1502 denotes an icon of the D-TV 104, 1503 is an icon of the IRD 102, and 1504 indicates an icon of the PC 106. In this operation, for easy understanding of the master device (pertinent device), it may be possible to display the control device in a color other than that of the other connected devices.

Figure 18:
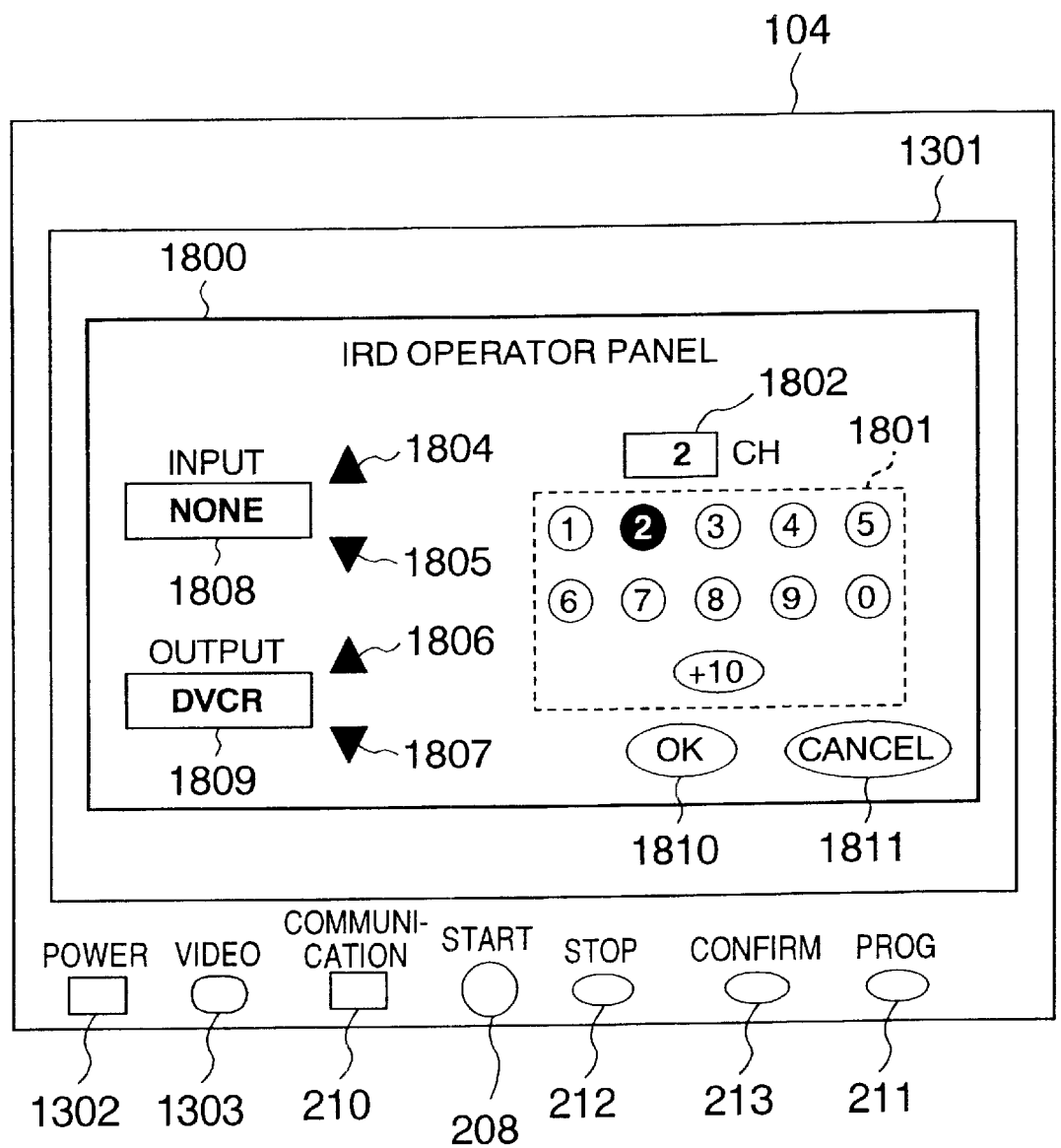
FIG. 18 is a front view of an IRD operator panel.

When the user first selects the IRD 102 (successively pats the icon 1503 of IRD twice), an IRD operator panel 1800 shown in FIG. 18 is displayed on the screen. The data is associated with the self-information data 1702 of IRD shown in FIG. 17. Numerals 1804 to 1807 are scroll buttons. When the user touches any one of the scroll buttons by a finger, a character string displayed on the left thereof is scrolled upward or downward. Numeral 1808 denotes an input device name when data is to be inputted to the IRD. In this case, since data is not inputted thereto, "NONE" is selected. Numeral 1809 is an output device name when data is to be outputted thereto. In this case, "D-VCR" is selected. Numeral 1802 indicates a reception channel. Channel 2 is selected in this case. When the setting is finished, the user selects an OK button 1810. When the setting is desired to be conducted again, the user selects a cancel button 1811.

Figure 19:
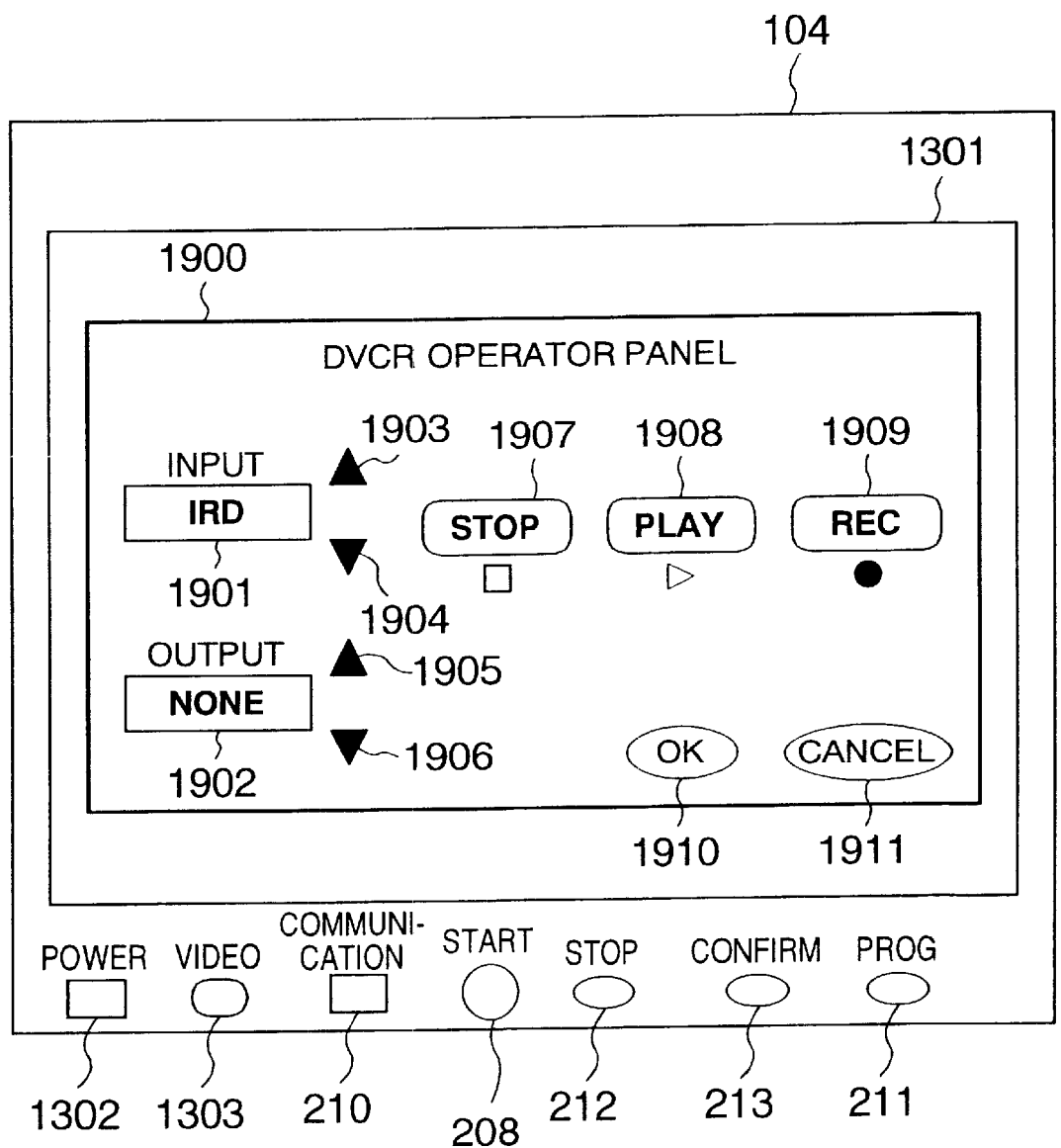
FIG. 19 is a front view of a D-VCR operator panel.

Next, when the icon 1501 of the D-VCR is selected, a D-VCR operator panel 1900 is displayed on the screen as shown in FIG. 19. The data is related to the self-information data 1704 of the D-VCR shown in FIG. 17. Numerals 1903 to 1906 are scroll buttons. When one of the scroll buttons is touched by a finger, a character string displayed on the left thereof is scrolled upward or downward. Numeral 1901 denotes an input device name when data is to be inputted to the D-VCR. "IRD" is selected in this case. Numeral 1902 is an output device name when data is to be outputted thereto. Since data is not outputted in this case, "NONE" is selected. Numerals 1907 to 1909 are buttons for the stopping, playing, and recording operations. "Recording" is selected in this case. When the setting is finished, the user selects an OK button 1910. When the setting is desired to be conducted again, the user selects a cancel button 1911. At this point of time, "the setting for the recording of channel 2 of IRD in the D-VCR" is completed.

Figure 20:
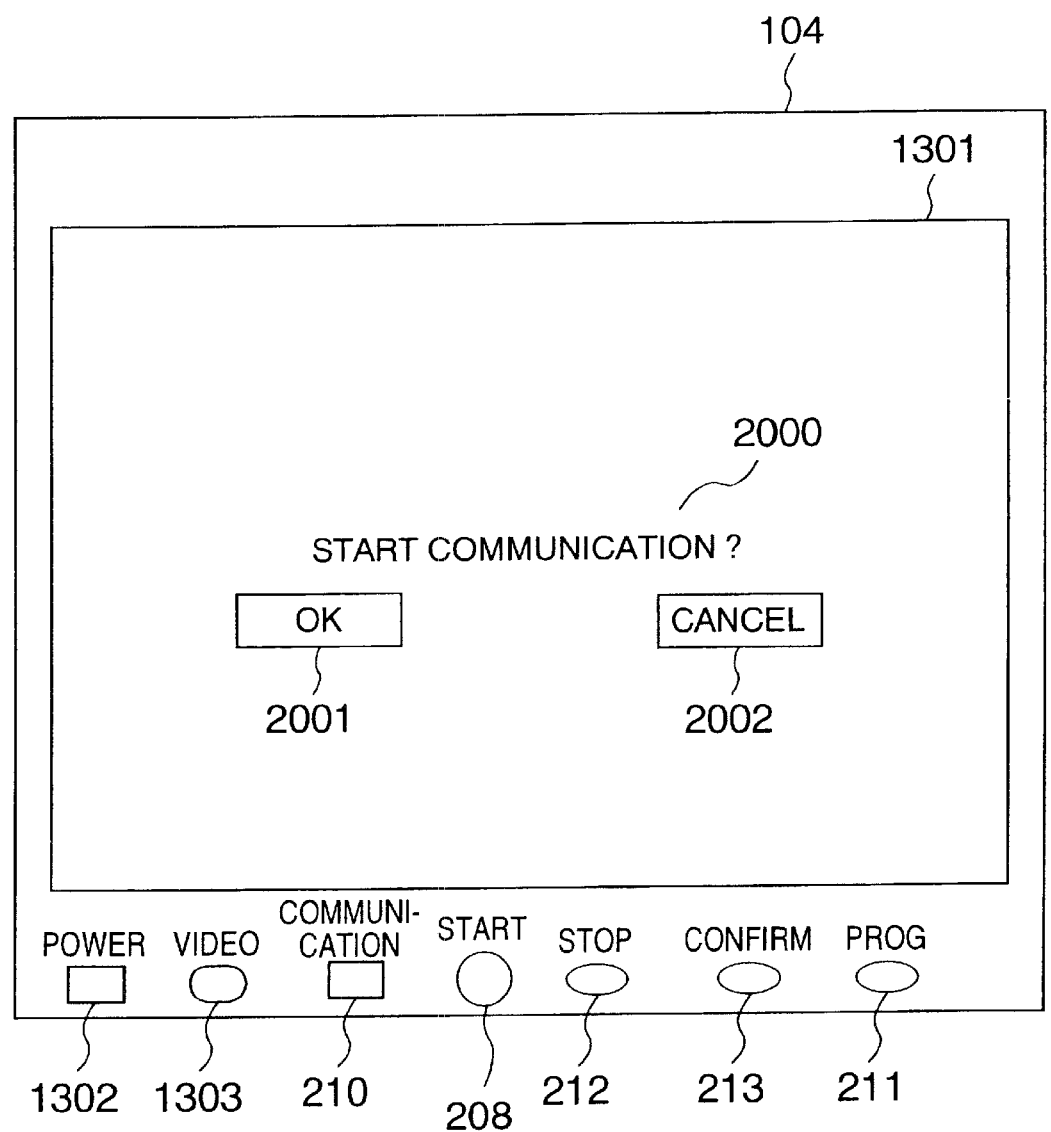
FIG. 20 is a front view for explaining a communication start grant screen.

Thereafter, when the communication start button 208 is pressed, an instruction "receive data via channel 2 and transmit the data to D-VCR (ID number=103)" and an instruction "record data (video) sent from the IRD 102 (ID number=102)" are respectively transmitted in the format of FIG. 12 to the IRD 102 (ID number=102) and the D-VCR 103 to thereby start the communication. In this connection, the communication may be started by selecting the OK button using the second device setting or by selecting the OK button 2001 after displaying characters "start communication?" as indicated by numeral 2000 of FIG. 20.

After this point, as in the case described in conjunction with an example in which the IRD is used as a master device to record the video from D-TV in the D-VCR, a plurality of communications can be configured by the program button 211 and any communication already started or reserved can be stopped by the confirmation button 213 and the stop button 212.

In accordance with the present invention, when a plurality of devices of the present invention are connected to each other, it is not necessary for the user to pay attention to the connecting sequence of the devices. Moreover, using one of the devices, the user can control the other devices. Additionally, the installation of driver software of each device, which is indispensable when peripheral devices of personal computers are connected to each other, becomes unnecessary. Namely, the user can utilize the system only by connecting the devices by cables.

What is claimed is:

1. An information device which configures an information device system which includes said information device and at least another information device connected to said information device, said information device comprising:

storage means for storing device name data indicating a device name of another information device of said at least another information device when said device name data is sent from said another information device to said information device; and request means for requesting another information device of said at least another information device, associated with a device name of said device name data stored in said storage means, to transmit function data including instruction data to enable said another information device to be controlled by said information device; and another storage means for storing therein said function data when said function data is received from said another information device.

2. An information device according to claim 1, wherein said information device and said another information device are connected by an IEEE 1394, a USB, a SSA, a fiber channel, a FC-EL or SCSI.

3. An information device which configures an information device system which includes said information device and at least another information device connected to said information device, said information device comprising:

first request means for requesting said another information device of said at least another information device to transmit device name data indicating a name of said another information device;

storage means for storing said device name data when said device name data from said another information device is received;

second request means for requesting said another information device, associated with a device name of said device name data stored in said storage means, to transmit function data of said another information device including instruction data to enable said another information device to be controlled by said information device; and another storage means for storing said function data when said function data is received from said another information device.

4. An information device according to claim 3, wherein said information device and said another information device are connected by an IEEE 1394, a USB, a SSA, a fiber channel, a FC-EL or SCSI.

5. An information device which configures an information device system which includes said information device and at least another information device connected to said information device, said information device comprising:

a transmitter which transmits device name data of said information device to another information device of said at least another information device; and another transmitter which transmits function data including instruction data to enable said information device to be controlled by said another information device of said information device to said another information device when a request is received from said another information device.

6. An information device according to claim 5, wherein based on said function data transmitted to said another information device from said information device, said another information device receives control information transmitted from said another information device to enable said information device to be controlled.

7. An information device according to claim 6, wherein said information device and said another information device are connected by an IEEE 1394, a USB, a SSA, a fiber channel, a FC-EL or SCSI.

8. An information device according to claim 5, wherein said information device and said another information device are connected by an IEEE 1394, a USB, a SSA, a fiber channel, a FC-EL or SCSI.

9. An information device which configures an information device system which includes said information device and at least another information device connected to said information device, said information device comprising:

storage means for storing device name data indicating a name of each another information device of said at least another information device when said device name of said each another information device is sent from said each another information device to said information device;

request means for requesting said another information device associated with a device name of said device name data stored in said storage means, to transmit function data including instruction data to enable said another information device to be controlled by said information device; and storage means for storing said function data when said function data is received from said another information device, wherein based on said function data, said information device transmits information necessary for controlling said another information device to said another information device.

10. An information device according to claim 9, wherein said information device and said another information device are connected by an IEEE 1394, a USB, a SSA, a fiber channel, a FC-EL or SCSI.

11. A method of controlling an information device system which includes said information device and at least another information devices connected together, said method comprising the steps of:

reading device name data from said information device and storing the device name data in storage means of another information device of said at least another information device;

reading from said another information device , associated with a device name of said device name data stored in said storage means, function data including instruction data to enable said information device to be controlled and storing said function data read in storage means of said another information device;

generating, based on said function data, control information for controlling said information device and transmitting said control information from said another information device to said information device.

12. An information device system which includes an information device and at least another information devices connected together, wherein said information device comprises:
storage means for storing device name data,
another storage means for storing function data to enable said information device to be controlled by said another information device of said at least another information device, wherein said another information device comprises:
storage means for storing device name data received from said information device;
request means for sending a request for function data including instruction data to enable said information device to be controlled by said another information device to said information device associated with said device name data,
another storage means for storing said function data received from said information device,
wherein said another information device generates, based on said function data, control information for controlling said information device and transmits said control information to said information device so as to permit said information device to be controlled by said another information device.

* * * * *

UNITED STATES PATENT AND TRADEMARK OFFICE
CERTIFICATE OF CORRECTION

PATENT NO. : 6,691,150 B1
DATED : February 10, 2004
INVENTOR(S) : Y. Yoshino et al.

It is certified that error appears in the above-identified patent and that said Letters Patent is hereby corrected as shown below:

<u>Title page,</u>
Item [30], Foreign Application Priority Data, should read as follows:
-- Dec. 26, 1996   (JP)………...08-347128
   Mar. 28, 1997   (JP)………….09-077442 --.

Signed and Sealed this

Twenty-ninth Day of June, 2004

JON W. DUDAS
*Acting Director of the United States Patent and Trademark Office*